US010362409B1

(12) United States Patent
Dewasurendra et al.

(10) Patent No.: US 10,362,409 B1
(45) Date of Patent: Jul. 23, 2019

(54) ADJUSTABLE LASER MICROPHONE

(71) Applicant: QUALCOMM Incorporated, San Diego, CA (US)

(72) Inventors: Duminda Dewasurendra, San Diego, CA (US); Vivek Rajendran, San Diego, CA (US); Daniel Jared Sinder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/913,701

(22) Filed: Mar. 6, 2018

(51) Int. Cl.
H04R 23/00 (2006.01)
H04R 3/00 (2006.01)
G01S 13/06 (2006.01)
G01S 13/58 (2006.01)
G01S 15/06 (2006.01)
G01S 15/58 (2006.01)
G01H 9/00 (2006.01)
H04R 1/40 (2006.01)
G10L 15/14 (2006.01)
G06T 7/70 (2017.01)
G06T 7/20 (2017.01)

(52) U.S. Cl.
CPC ............. *H04R 23/008* (2013.01); *G01H 9/00* (2013.01); *G01S 13/06* (2013.01); *G01S 13/58* (2013.01); *G01S 15/06* (2013.01); *G01S 15/58* (2013.01); *H04R 3/00* (2013.01); *G06T 7/20* (2013.01); *G06T 7/70* (2017.01); *G06T 2207/10016* (2013.01); *G10L 15/14* (2013.01); *H04R 1/406* (2013.01); *H04R 2410/03* (2013.01)

(58) Field of Classification Search
CPC ........ H04R 23/008; H04R 3/00; H04R 1/406; H04R 2410/03; G01H 9/00; G01S 13/06; G01S 13/58; G01S 15/06; G01S 15/58; G06T 7/70; G06T 7/20; G06T 2207/10016; G10L 15/14
See application file for complete search history.

(56) References Cited

U.S. PATENT DOCUMENTS

| 6,014,239 | A | * | 1/2000 | Veligdan | H04B 10/114 381/170 |
| 9,666,191 | B1 | * | 5/2017 | Bakish | G10L 15/25 |
| 2005/0256715 | A1 | * | 11/2005 | Okimoto | G06F 17/2715 704/257 |
| 2012/0259638 | A1 | * | 10/2012 | Kalinli | G10L 15/25 704/270 |

(Continued)

*Primary Examiner* — Andrew L Sniezek
(74) *Attorney, Agent, or Firm* — Toler Law Group, P.C.

(57) ABSTRACT

A method of capturing audio includes initiating capture, at a laser microphone, of first audio of an area of interest. The first audio is captured while the laser microphone is focused on a first target surface associated with the area of interest. The method also includes generating adjustment parameters based on a feedback signal to adjust targeting characteristics of the laser microphone. The method further includes adjusting the targeting characteristics of the laser microphone based on the adjustment parameters to focus the laser microphone on a second target surface associated with the area of interest. The method also includes initiating capture, at the laser microphone, of second audio of the area of interest in response to adjusting the targeting characteristics. The second audio has an audio quality that is greater than the first audio.

27 Claims, 13 Drawing Sheets

(56) References Cited

U.S. PATENT DOCUMENTS

| | | | |
|---|---|---|---|
| 2013/0129100 A1* | 5/2013 | Sorensen | H04R 3/005 |
| | | | 381/66 |
| 2013/0144621 A1* | 6/2013 | Chen | G09B 7/02 |
| | | | 704/246 |
| 2017/0257709 A1* | 9/2017 | Cohen | H04N 7/147 |
| 2018/0146304 A1* | 5/2018 | Sebastian | H04R 23/008 |

* cited by examiner

ADJUSTABLE LASER MICROPHONE

I. FIELD

The present disclosure is generally related to a laser microphone.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These mobile devices can communicate voice and data packets over wireless networks. Further, many such devices incorporate additional functionality such as a digital still camera, a digital video camera, a digital recorder, and an audio file player. Also, such mobile devices can process executable instructions, including software applications, such as a web browser application, that can be used to access the Internet. As such, these mobile devices can include significant computing capabilities.

A mobile device may include a microphone that is operable to capture audio based on the effects of surface vibrations on a light beam emitted by the microphone. To illustrate, the microphone may direct the light beam to a surface that is proximate to a sound source, and vibrations of the surface, caused by sound waves from the sound source, may change properties of the reflected light beam. For example, the vibrations of the surface may change a frequency of the light beam and a phase of the light beam. The change in properties may be used at the microphone to capture sound at the surface. For example, a reflected light beam (having the changed properties) from the surface may be received by the microphone, and the microphone may generate audio representative of the sound based on the reflected light beam. However, if a location of the surface, or a material of the surface, or the reflectivity of the surface adversely effects the vibration of the surface, the audio may have relatively low quality.

III. SUMMARY

According to a particular implementation of the techniques disclosed herein, an apparatus includes a laser microphone and a processor coupled to the laser microphone. The processor is configured to initiate capture, at the laser microphone, of first audio of an area of interest. The first audio is captured while the laser microphone is focused on a first target surface associated with the area of interest. The processor is also configured to generate adjustment parameters based on a feedback signal to adjust targeting characteristics of the laser microphone. The processor is further configured to adjust the targeting characteristics of the laser microphone based on the adjustment parameters to focus the laser microphone on a second target surface associated with the area of interest. The processor is also configured to initiate capture, at the laser microphone, of second audio of the area of interest in response to adjusting the targeting characteristics. The second audio has an audio quality that is greater than the first audio.

According to another particular implementation of the techniques disclosed herein, a method of capturing audio includes initiating capture, at a laser microphone, of first audio of an area of interest. The first audio is captured while the laser microphone is focused on a first target surface associated with the area of interest. The method also includes generating adjustment parameters based on a feedback signal to adjust targeting characteristics of the laser microphone. The method further includes adjusting the targeting characteristics of the laser microphone based on the adjustment parameters to focus the laser microphone on a second target surface associated with the area of interest. The method also includes initiating capture, at the laser microphone, of second audio of the area of interest in response to adjusting the targeting characteristics. The second audio has an audio quality that is greater than the first audio.

According to another particular implementation of the techniques disclosed herein, a non-transitory computer-readable medium includes instructions that, when executed by a processor, cause the processor to perform operations including initiating capture, at a laser microphone, of first audio of an area of interest. The first audio is captured while the laser microphone is focused on a first target surface associated with the area of interest. The operations also include generating adjustment parameters based on a feedback signal to adjust targeting characteristics of the laser microphone. The operations further include adjusting the targeting characteristics of the laser microphone based on the adjustment parameters to focus the laser microphone on a second target surface associated with the area of interest. The operations also include initiating capture, at the laser microphone, of second audio of the area of interest in response to adjusting the targeting characteristics. The second audio has an audio quality that is greater than the first audio.

According to another particular implementation of the techniques disclosed herein, an apparatus includes means for capturing first audio of an area of interest. The first audio captured is while the means for capturing is focused on a first target surface associated with the area of interest. The apparatus also includes means for generating adjustment parameters based on a feedback signal to adjust targeting characteristics of the means for capturing. The apparatus further includes means for adjusting the targeting characteristics of the means for capturing based on the adjustment parameters to focus the means for capturing on a second target surface associated with the area of interest. The second audio of the area of interest is captured by the means for capturing in response to adjusting the targeting characteristics, and the second audio has an audio quality that is greater than the first audio.

One advantage of the above-described implementations is capture of high quality audio using a laser microphone. For example, targeting of the laser microphone may be dynamically readjusted based on feedback until high quality audio (e.g., high quality speech) is captured. Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining", "calculating", "detecting", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", "using", or "determining" a parameter (or a signal) may refer to actively generating, estimating, calculating, or determining the parameter (or the signal) or may refer to using, selecting, or accessing the parameter (or signal) that is already generated, such as by another component or device.

Figure 1A:
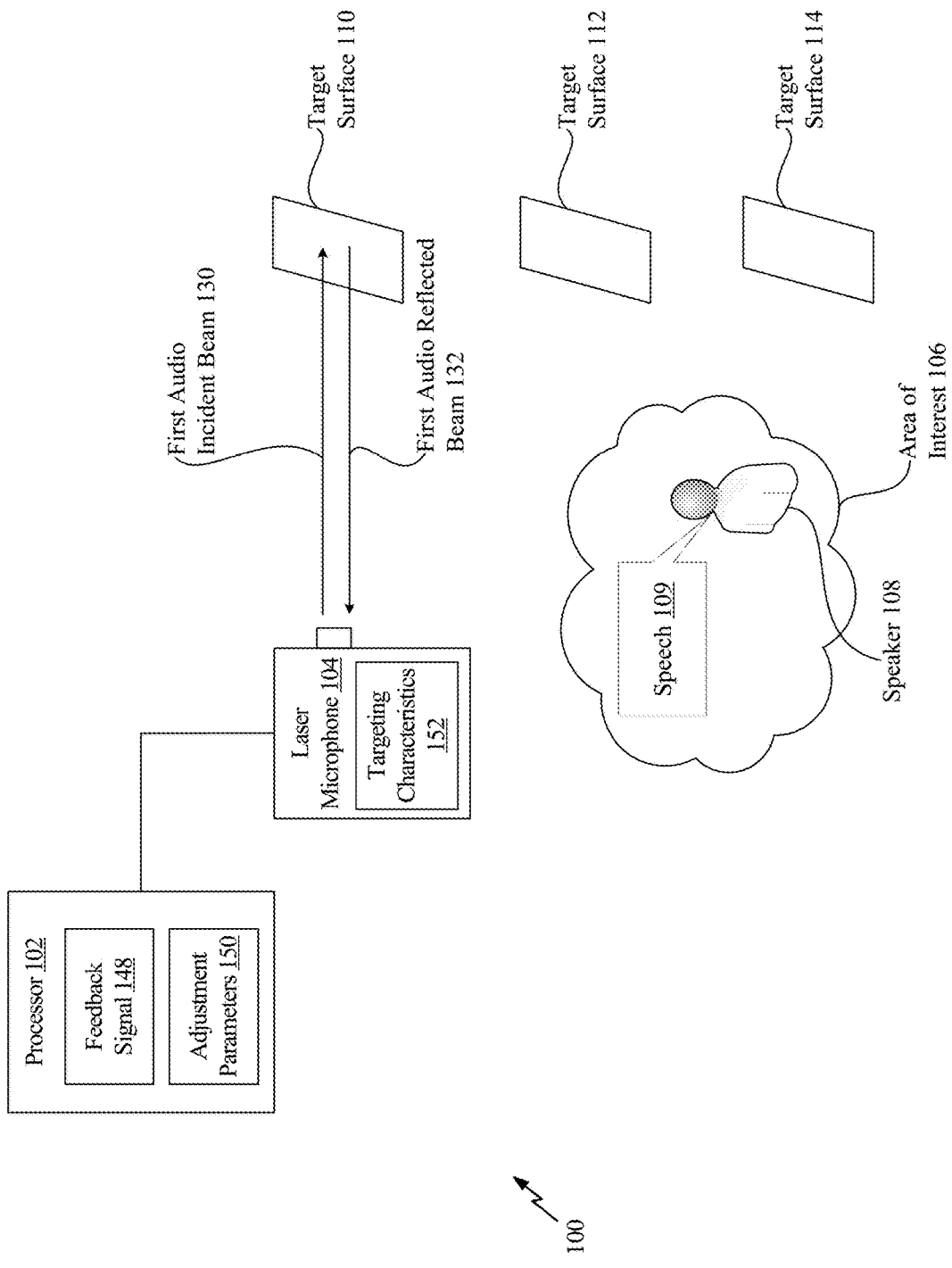
FIG. 1A is a diagram of a system that is operable to adjust a laser microphone to improve audio capture.

Referring to FIG. 1A, a system 100 that is operable to adjust a laser microphone to improve audio capture is shown. The system 100 includes a processor 102 that is coupled to a laser microphone 104. According to one implementation, the laser microphone 104 is a vibrometer. As a non-limiting example, the laser microphone 104 may be a Laser Doppler Vibrometer.

In FIG. 1A, a speaker 108 is located in an area of interest 106. As non-limiting examples, the area of interest 106 may be a room, a corner of a room, a particular area outside, etc. In the implementation of FIG. 1A, the speaker 108 generates speech 109 (e.g., talks), and the laser microphone 104 is configured to capture the speech 109 based on vibrations of surfaces proximate to (or within) the area of interest 106. To illustrate, a target surface 110 is proximate to the area of interest 106, a target surface 112 is proximate to the area of interest 106, and a target surface 114 is proximate to the area of interest 106. Sound waves associated with the speech 109 collide with (e.g., reflect from) the target surfaces 110, 112, 114 and cause the target surfaces 110, 112, 114 to vibrate. As described in greater detail below, the laser microphone 104 directs incident light beams at the target surfaces 110, 112, 114 to determine the effects that the vibrations of the target surfaces 110, 112, 114 have on properties of the incident light beams. The effects that the vibrations have on the incident light beams are represented in reflected light beams from the target surfaces 110, 112, 114. Because the vibrations of the target surfaces 110, 112, 114 are based on the sound waves associated with the speech 109, as described below, the speech 109 may be captured by performing a superposition operation on the reflected light beams and light beams having properties similar to the incident light beams (e.g., reference light beams).

It should be noted that the techniques described herein may be used to capture any sound and are not limited to speech. Additionally, in other implementations, the target surfaces 110, 112, 114 correlate to different portions of the same surface. As a non-limiting example, the target surface 110 can correspond to a first portion of a wall that is relatively far from the speaker 108, the target surface 112 can correspond to a second portion of the wall that is closer in proximity to the speaker 108, and the target surface 114 can correspond to a third portion of the wall that is closest in proximity to the speaker 108. Thus, although the following description describes the target surfaces 110, 112, 114 as three different surfaces, such as a wall, a table, and a lamp, as non-limiting examples, it should be understood that the target surfaces 110, 112, 114 may be different portions of the same surface.

The processor 102 is configured to initiate capture, at the laser microphone 104, of first audio of the area of interest 106. In FIG. 1A, the first audio corresponds to the speech 109 of the speaker 108. The first audio is captured while the laser microphone 104 is focused on the target surface 110. The process for capturing the first audio is described with respect to FIG. 2.

Figure 2:
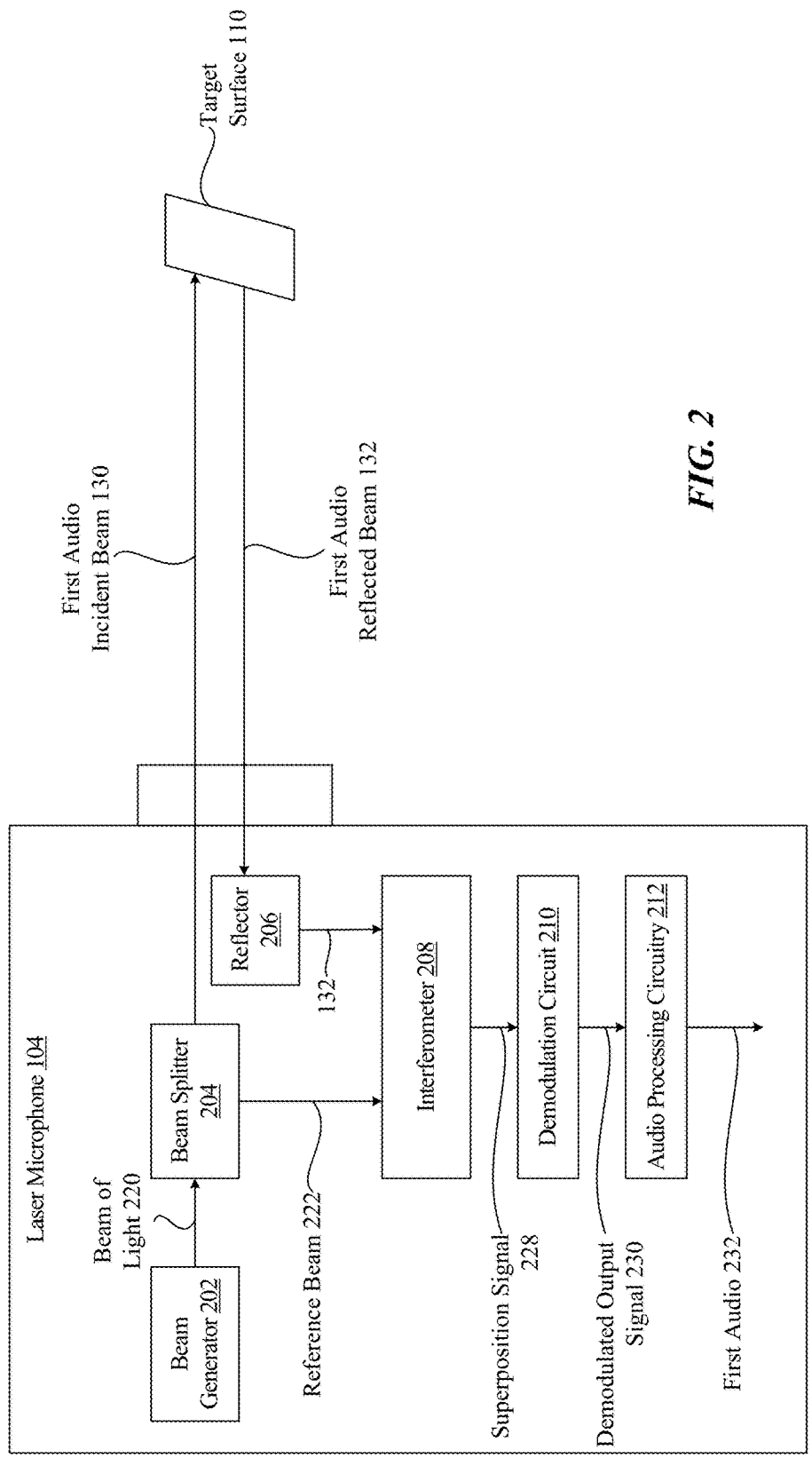
FIG. 2 is a diagram of the laser microphone capturing first audio based on vibrations of a first target surface.

FIG. 2 illustrates a block diagram of an implementation of the laser microphone 104 capturing the first audio using the target surface 110. The laser microphone 104 includes a beam generator 202, a beam splitter 204, a reflector 206, an interferometer 208, a demodulation circuit 210, and audio processing circuitry 212.

The beam generator 202 is configured to generate a beam of light 220. The beam of light 220 has a particular frequency and a particular phase. The beam generator 202 directs the beam of light 220 towards the beam splitter 204. The beam splitter 204 is configured to split the beam of light 220 into a reference beam 222 and into a first audio incident beam 130. The reference beam 222 and the first audio incident beam 130 have similar properties. For example, the reference beam 222 and the first audio incident beam 130 have similar frequencies and phases. According to one implementation, the particular frequency of the beam of light 220 is similar to the frequencies of the beams 222, 130, and the particular phase of the beam of light 220 is similar to the phases of the beams 222, 130. The beam splitter 204 splits the beam of light 220 such that the reference beam 222 is provided to the interferometer 208 and the first audio incident beam 130 is directed towards the target surface 110.

The first audio incident beam 130 is reflected from the target surface 110 as a first audio reflected beam 132. The first audio reflected beam 132 may have different properties (e.g., a different frequency, a different phase, or both) than the first audio incident beam 130 based on the vibrations of the target surface 110. For example, the frequency of the first audio reflected beam 132 and the phase of the first audio reflected beam 132 are based on the velocity and the displacement (e.g., the vibrations) of the target surface 110. As described with respect to FIG. 1A, the vibrations of the target surface 110 are based on sound waves of the speech 109 colliding with the target surface 110. Thus, the frequency of the first audio reflected beam 132 and the phase of the first audio reflected beam 132 is representative, at least in part, of the speech 109.

The first audio reflected beam 132 is directed at the reflector 206, and the reflector 206 redirects the first audio reflected beam 132 to the interferometer 208. According to one implementation, the first audio reflected beam 132 is directed to the interferometer 208 without use of the reflector 206. The interferometer 208 is configured to perform a superposition operation on the first audio reflected beam 132 and the reference beam 222 to generate a superposition signal 228. The superposition signal 228 is provided to the demodulation circuit 210. The demodulation circuit 210 is configured to generate a demodulated output signal 230 based on the superposition signal 228. The demodulated output signal 230 indicates the shift (e.g., the "Doppler" shift) in frequency between the reference beam 222 and the first audio reflected beam 132. As described above, the shift in frequency is based on the sound waves of the speech colliding with the target surface 110. The demodulated output signal 230 is provided to the audio processing circuitry 212. The audio processing circuitry 212 is configured to perform audio processing operations to generate first audio 232 that is reflective of the speech 109.

Referring back to FIG. 1A, the processor 102 is configured to generate adjustment parameters 150 based on a feedback signal 148 to adjust targeting characteristics 152 of the laser microphone 104. As described in greater detail with respect to FIGS. 4-9, the feedback signal 148 may include an indication of a signal-to-noise ratio of the first audio 232, speech statistics associated with the first audio 232, video data associated with video of the area of interest 106 captured by a video camera, beamforming data indicating a source angle associated with the first audio 232, radar data indicating a position of an object (e.g., the speaker 108), ultrasound data, etc. Thus, in some implementations, the processor 102 may use the feedback signal 148 to determine the quality of the first audio 232.

The adjustment parameters 150 indicate how the targeting characteristics 152 of the laser microphone 104 are to be adjusted to improve the quality of captured audio. To illustrate, the adjustment parameters 150 may indicate how the targeting characteristics 152 should be adjusted to focus the laser microphone 104 on (e.g., orient the laser microphone 104 toward) the target surface 112 (as opposed to the target surface 110) to capture higher quality audio. As a non-limiting example, the adjustment parameters 150 may include a rectangular coordinate offset (x, y, z) to existing targeting characteristics 152 of the laser microphone 104. In response to adjusting the existing targeting characteristics 152 by the rectangular coordinate offset, the laser microphone 104 focuses on the target surface 112. As another non-limiting example, the adjustment parameters 150 may include a polar coordinate offset (θ, θ, r) to existing targeting characteristics 152 of the laser microphone 104. In response to adjusting the existing targeting characteristics 152 by the polar coordinate offset, the laser microphone 104 focuses on the target surface 112. As another non-limiting example, the adjustment parameters 150 may include coordinate values (e.g., rectangular or polar coordinate values) that are used to replace coordinate values of existing targeting characteristics 152.

The targeting characteristics 152 may include at least one of an angle of rotation of the laser microphone 104, a transmit power of the laser microphone 104, a tilt of the laser microphone 104, or a focus metric of the laser microphone 104. The processor 102 is configured to adjust the targeting characteristics 152 of the laser microphone 104 based on the adjustment parameters 150 to focus the laser microphone 104 on the target surface 112. For example, referring to FIG. 1B, the laser microphone 104 is rotated to focus on the target surface 112.

Figure 1B:
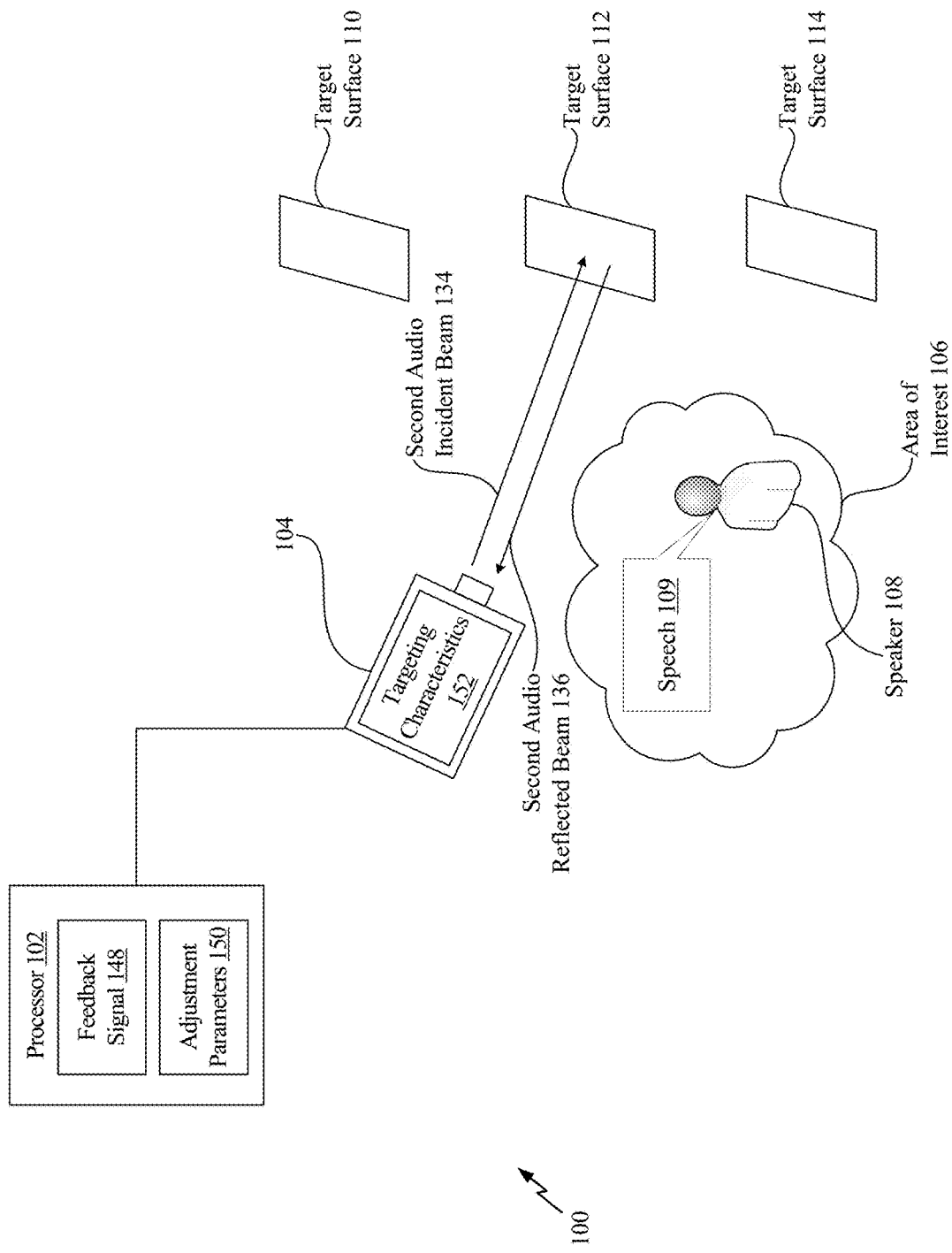
FIG. 1B is another diagram of the system of FIG. 1A.

The processor 102 is configured to initiate capture, at the laser microphone 104, of second audio of the area of interest 106. In FIG. 1B, the second audio corresponds to the speech 109 of the speaker 108. The second audio is captured while the laser microphone 104 is focused on the target surface 112. The process for capturing the second audio is described with respect to FIG. 3.

Figure 3:
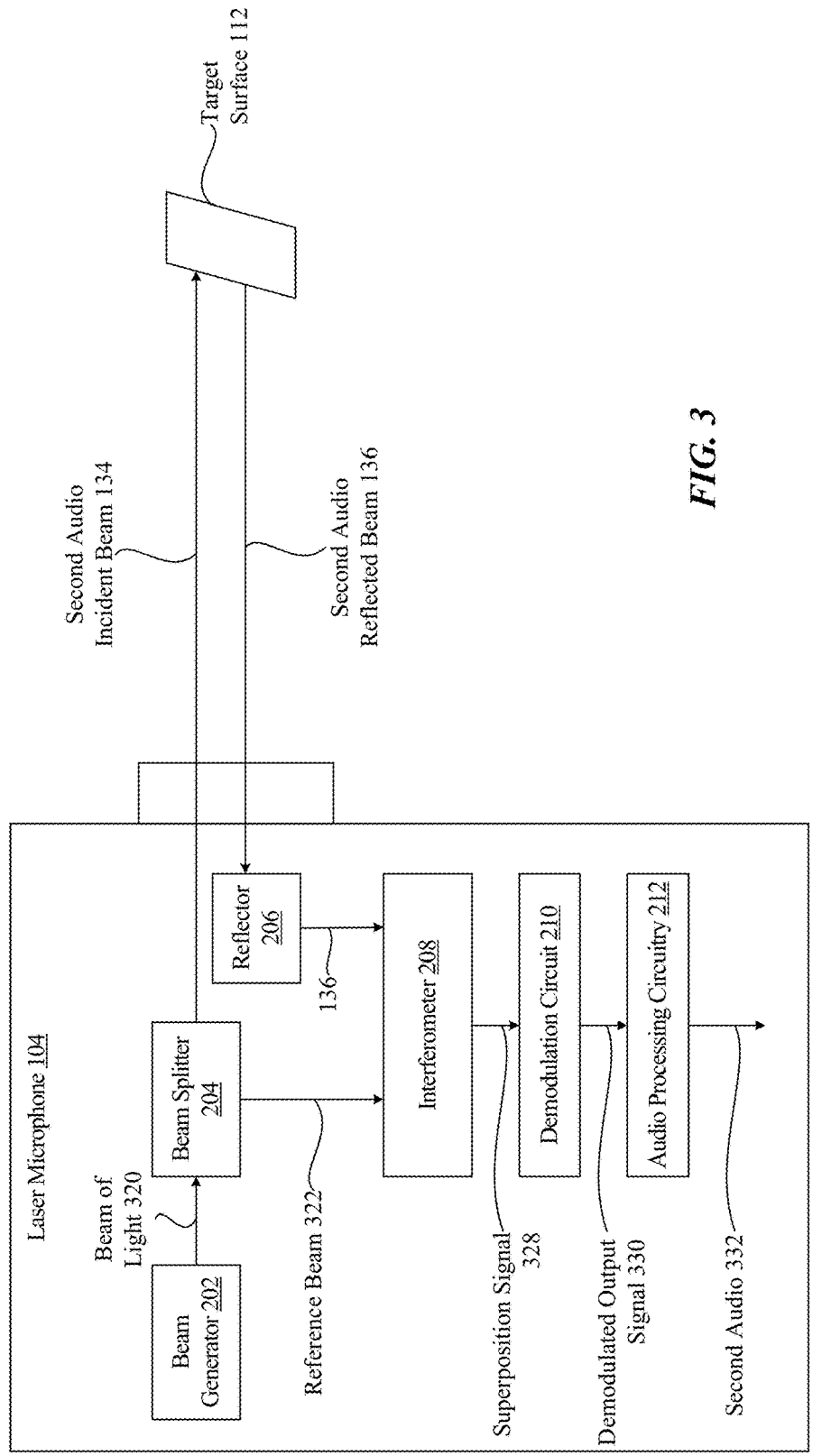
FIG. 3 is a diagram of the laser microphone capturing second audio based on vibrations of a second target surface.

FIG. 3 illustrates the block diagram of the implementation of the laser microphone 104 capturing second first audio using the target surface 112. The beam generator 202 is configured to generate a beam of light 320. The beam of light 320 has a particular frequency and a particular phase. The beam generator 202 directs the beam of light 320 towards the beam splitter 204. The beam splitter 204 is configured to split the beam of light 320 into a reference beam 322 and into a second audio incident beam 134. The reference beam 322 and the second audio incident beam 134 have similar properties. For example, the reference beam 322 and the second audio incident beam 134 have similar frequencies and phases. According to one implementation, the particular frequency of the beam of light 320 is similar to the frequencies of the beams 322, 134, and the particular phase of the beam of light 320 is similar to the phases of the beams 322, 134. The beam splitter 204 splits the beam of light 320 such that the reference beam 322 is provided to the interferometer 208 and the second audio incident beam 134 is directed towards the target surface 112.

The second audio incident beam 134 is reflected from the target surface 112 as a second audio reflected beam 136. The second audio reflected beam 136 may have different properties (e.g., a different frequency, a different phase, or both) than the second audio incident beam 134 based on the vibrations of the target surface 112. For example, the frequency of the second audio reflected beam 136 and the phase of the second audio reflected beam 136 is based on the velocity and the displacement (e.g., the vibrations) of the target surface 112. The vibrations of the target surface 112 are based on sound waves of the speech 109 colliding with the target surface 112. Thus, the frequency of the second audio reflected beam 136 and the phase of the second audio reflected beam 136 is representative, at least in part, of the speech 109.

The second audio reflected beam 136 is directed at the reflector 206, and the reflector 206 redirects the second audio reflected beam 136 to the interferometer 208. According to one implementation, the second audio reflected beam 136 is directed to the interferometer 208 without use of the reflector 206. The interferometer 208 is configured to perform a superposition operation on the second audio reflected beam 136 and the reference beam 322 to generate a superposition signal 328. The superposition signal 328 is provided to the demodulation circuit 210. The demodulation circuit 210 is configured to generate a demodulated output signal 330 based on the superposition signal 328. The demodulated output signal 330 indicates the shift (e.g., the "Doppler" shift) in frequency between the reference beam 322 and the second audio reflected beam 136. As described above, the shift in frequency is based on the sound waves of the speech 109 colliding with the target surface 112. The demodulated output signal 330 is provided to the audio processing circuitry 212. The audio processing circuitry 212 is configured to perform audio processing operations to generate second audio 332 that is reflective of the speech 109.

The techniques described with respect to FIGS. 1A-3 enable the laser microphone 104 to capture high quality audio by adjusting the targeting characteristics of the laser microphone 104 based on the feedback signal 148. For example, the second audio 332 captured while the laser microphone 104 is directed at the target surface 112 may have better audio quality (e.g., signal-to-noise ratio, volume, etc.) than the first audio 232 captured while the laser microphone 104 is directed at the target surface 110. The feedback signal 148 includes information that, when processed by the processor 102, enables the processor 102 to adjust the targeting characteristics 152 to focus the laser microphone 104 on a surface that yields the capture of better audio. Thus, the techniques described with respect to FIGS. 1A-3 facilitate dynamic readjustment of the targeting of the laser microphone 104 until high quality audio (e.g., high quality speech) is captured.

Figure 4:
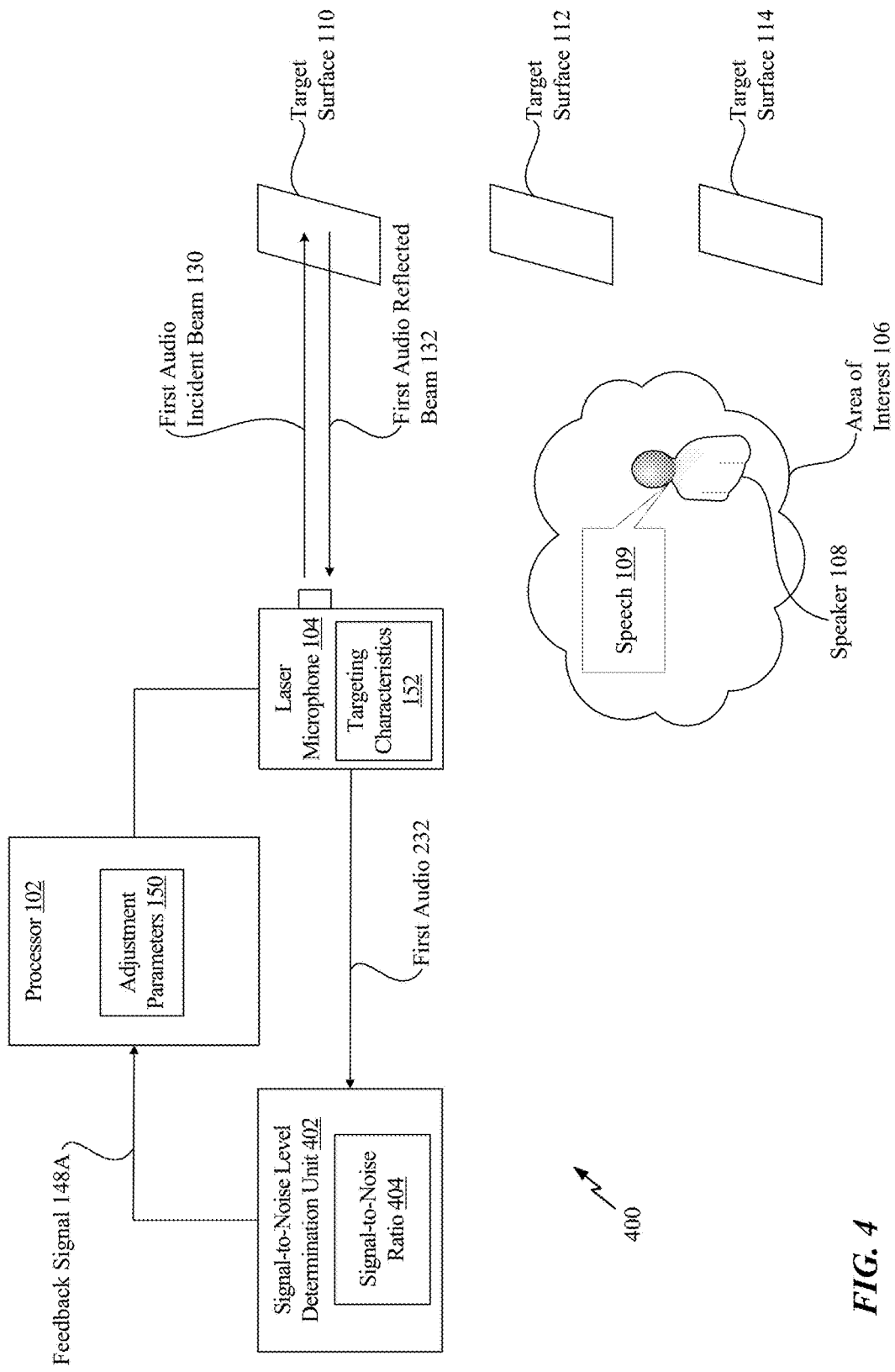
FIG. 4 is a diagram of a system that is operable to adjust the laser microphone to improve audio capture using signal-to-noise ratio feedback.

Referring to FIG. 4, another system 400 that is operable to adjust a laser microphone to improve audio capture is shown. The system 400 includes the processor 102, the laser microphone 104, and a signal-to-noise level determination unit 402. According to some implementations, the signal-to-noise level determination unit 402 is integrated into the processor 102.

The signal-to-noise level determination unit 402 is configured to determine a signal-to-noise ratio 404 (e.g., indicating a relative intensity of noise) of the first audio 232 captured by the laser microphone 104. The signal-to-noise level determination unit 402 may generate a feedback signal 148A and provide the feedback signal 148A to the processor 102. The feedback signal 148A corresponds to the feedback signal 148 of FIGS. 1A-1B. The feedback signal 148A indicates the signal-to-noise ratio 404.

In response to receiving the feedback signal 148A, the processor 102 determines whether the signal-to-noise ratio 404 satisfies a threshold. If the signal-to-noise ratio 404 satisfies the threshold, the processor 102 bypasses adjusting the targeting characteristics 152 of the laser microphone 104. As a result, the laser microphone 104 continues to capture audio by directing beams at the target surface 110. However, if the signal-to-noise ratio 404 fails to satisfy the threshold, the processor 102 adjusts the targeting characteristics 152 of the laser microphone 104 so that the laser microphone 104 directs beams at a different target surface, such as the target surface 112 as shown in FIG. 1B.

The system 400 of FIG. 4 enables the processor 102 to adjust the targeting characteristics 152 of the laser microphone 104 based on the signal-to-noise ratio 404 of the first audio 232. As a result, if the first audio 232 has a relatively low signal-to-noise ratio 404, the laser microphone 104 can focus on another target surface to capture audio having a high signal-to-noise ratio. Thus, the system 400 facilitates dynamic readjustment of the targeting of the laser microphone 104 until high quality audio (e.g., high quality speech) is captured.

Figure 5:
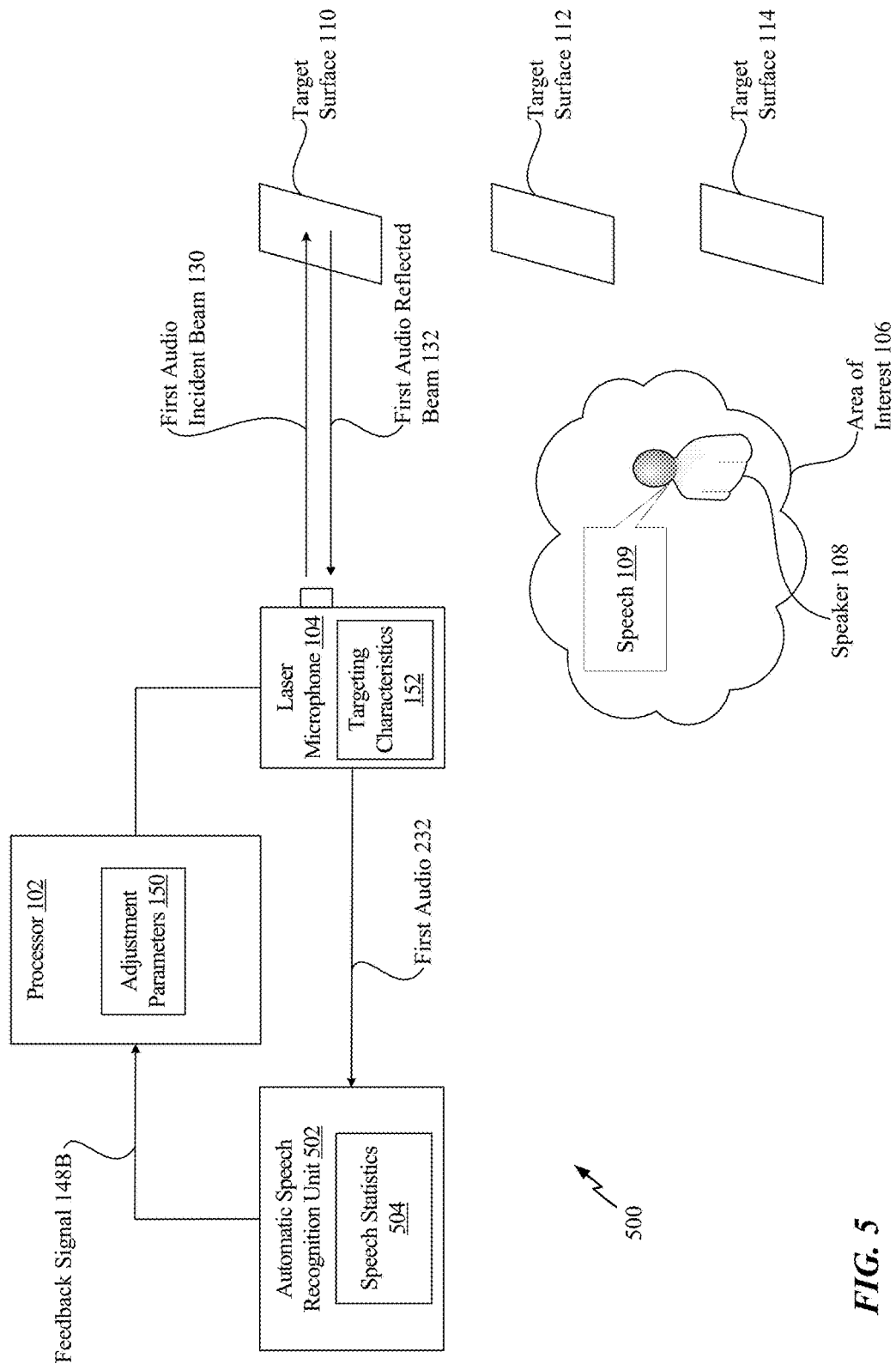
FIG. 5 is a diagram of a system that is operable to adjust the laser microphone to improve audio capture using automatic speech recognition feedback.

Referring to FIG. 5, another system 500 that is operable to adjust a laser microphone to improve audio capture is shown. The system 500 includes the processor 102, the laser microphone 104, and an automatic speech recognition unit 502. According to some implementations, the automatic speech recognition unit 502 is integrated into the processor 102.

The automatic speech recognition unit 502 is configured to perform an automatic speech recognition operation on the first audio 232 to generate speech statistics 504 associated with the first audio 232. The automatic speech recognition unit 502 may generate a feedback signal 148B and provide the feedback signal 148B to the processor 102. The feedback signal 148B corresponds to the feedback signal 148 of FIGS. 1A-1B. The feedback signal 148B includes the speech statistics 504.

In response to receiving the feedback signal 148B, the processor 102 determines whether the speech statistics 504 indicate that an acceptable level of speech is captured by the laser microphone 104. As a non-limiting example, the processor 102 determines whether the speech statistics 504 indicate that a confidence value of the accuracy of the recognized speech satisfies a confidence threshold. If the confidence value satisfies the confidence threshold, the speech statistics 504 indicate that an acceptable level of speech is captured. However, if the confidence value fails to satisfy the confidence threshold, the speech statistics 504 indicate that an acceptable level of speech has not been captured. If the speech statistics 504 indicate that an acceptable level of speech is captured by the laser microphone 104, the processor 102 bypasses adjusting the targeting characteristics 152 of the laser microphone 104. As a result, the laser microphone 104 continues to capture audio by directing beams at the target surface 110. However, if the speech statistics 504 do not indicate that an acceptable level of speech is captured by the laser microphone 104, the processor 102 adjusts the targeting characteristics 152 of the laser microphone 104 so that the laser microphone 104 directs beams at a different target surface, such as the target surface 112 as shown in FIG. 1B.

The system 500 of FIG. 5 enables the processor 102 to adjust the targeting characteristics 152 of the laser microphone 104 based on the speech statistics 504 associated with the first audio 232. As a result, if the speech statistics 504 do not indicate that an acceptable level of speech is captured by the laser microphone 104, the laser microphone 104 can focus on another target surface to better capture the speech 109. Thus, the system 500 facilitates dynamic readjustment of the targeting of the laser microphone 104 until high quality audio (e.g., high quality speech) is captured.

Figure 6:
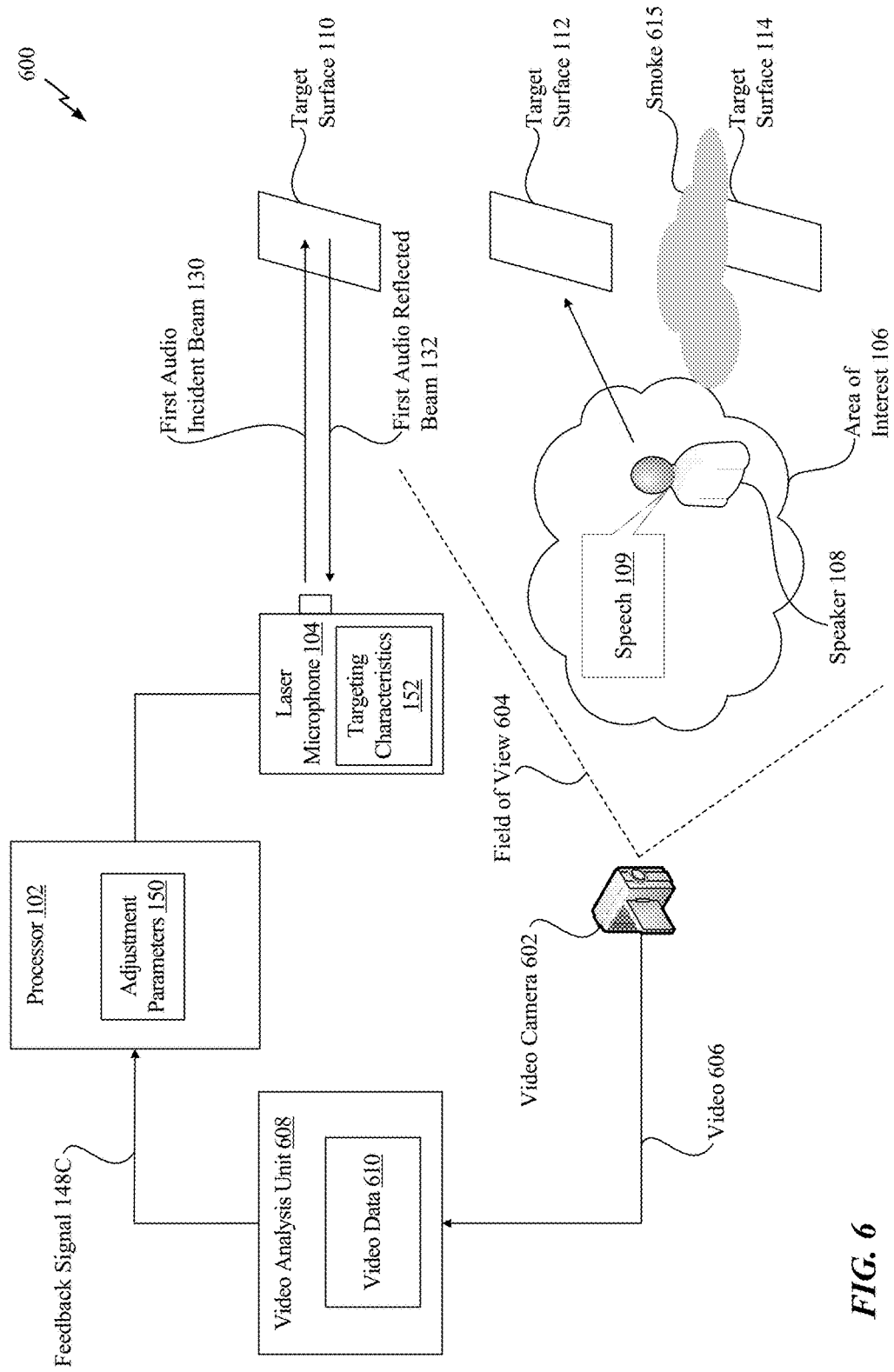
FIG. 6 is a diagram of a system that is operable to adjust a laser microphone to improve audio capture using video data as feedback.

Referring to FIG. 6, another system 600 that is operable to adjust a laser microphone to improve audio capture is shown. The system 600 includes the processor 102, the laser microphone 104, a video camera 602, and a video analysis unit 608. According to some implementations, the video analysis unit 608 is integrated into the processor 102.

The video camera 602 is configured to capture video 606 of the area of interest 106, of surrounding areas, or both. For example, in FIG. 6, a field of view 604 of the video camera 602 captures the speaker 108, the target surface 110, the target surface 112, and the target surface 114. As a result, the video 606 can capture a location of activity in the area of interest 106 (e.g., a location of the speaker 108), the locations of each target surface 110, 112, 114, a location of any possible obstructions to laser beams (e.g., smoke 615), or a combination thereof. The video 606 is provided to the video analysis unit 608.

The video analysis unit 608 is configured to generate video data 610 based on the captured video 606. The video data 610 indicates the location of activity in the area of interest 106 (e.g., a location of the speaker 108), the locations of each target surface 110, 112, 114, the location of any possible obstructions to laser beams (e.g., smoke 615), a direction of movement of the speaker 108 in the area of interest 106, or a combination thereof. For example, in FIG. 6, the speaker 108 may move towards the target surface 112, and the video data 610 indicates the direction of the movement. Based on the movement, the laser microphone 104 may target nearby surfaces (e.g., the target surface 112). The video analysis unit 608 may generate a feedback signal 148C and provide the feedback signal 148C to the processor 102. The feedback signal 148C corresponds to the feedback signal 148 of FIGS. 1A-1B. In some implementations, the feedback signal 148C includes the video data 610.

In response to receiving the feedback signal 148C (e.g., the video data 610), the processor 102 determines how to adjust the targeting characteristics 152 of the laser microphone 104. For example, the processor 102 selects a target surface 110, 112, 114 that a laser beam could reach without (or with minimal) obstruction and that is also close in proximity to the speaker 108. Based on the selection, the processor 102 generates the adjustment parameters 150 and adjusts the targeting characteristics 152 of the laser microphone 104 so that the laser microphone 104 directs beams at a different target surface, such as the target surface 112 as shown in FIG. 1B that is the closest to the speaker 108 that is not obscured (e.g., by the smoke 615).

According to one implementation, the video camera 602 can be used to perform an "audio zoom" operation using the laser microphone 104. As a non-limiting example, a human controller can use the video camera 602 to zoom into a particular area of a particular target surface (e.g., focus in on a particular target surface). Based on the zoom, the video camera 602 may capture video 606 of the particular area, and the video analysis unit 608 may generate video data 610 indicating a location the particular area. The processor 102 may adjust the targeting characteristics 152 such that the laser microphone 104 directs an incident beam at the particular area. As a result, the laser microphone 104 can filter out noise between the laser microphone 104 and the particular area, thus "zooming" into the particular area to capture high-quality audio associated with the particular area.

According to one implementation, the second target surface 112 is selected among a set of new target surfaces available 112, 114 other than the first target surface 110, by the video analysis unit 608, as a target for the laser microphone 104 based on particular criteria. For example, if the video analysis unit 608 determines that the target surface 112 is comprised of plastic and the other target surfaces 114 are comprised of wood, the laser microphone 104 focuses on the target surface 112 comprised of plastic as the second target surface. Thus, the particular criteria may include focusing on target surfaces having the best reflectivity characteristics.

According to one implementation, the first target surface 110 is selected among a set of known surfaces placed in predetermined locations. The reflectivity of the set of known surfaces is enhanced a-priori by applying retroreflective tape or paint to improve the output speech quality. The location and availability of the set of known surfaces are provided to the processor 102 in advance. While scanning for a better second surface, if the speech quality metrics obtained from a second target surface (not included in the set of known surfaces) is worse than speech quality metrics obtained from the first target surface, the processor 102 may adjust the targeting characteristics 152 of the laser microphone 104 towards a second surface selected among the set of known surfaces.

The system 600 of FIG. 6 enables the processor 102 to adjust the targeting characteristics 152 of the laser microphone 104 based on the visual data. As a result, if the visual data indicates that a better target surface to focus the laser microphone 104 is available, the laser microphone 104 can focus on another target surface to better capture the speech 109. Thus, the system 600 facilitates dynamic readjustment of the targeting of the laser microphone 104 until high quality audio (e.g., high quality speech) is captured.

Figure 7:
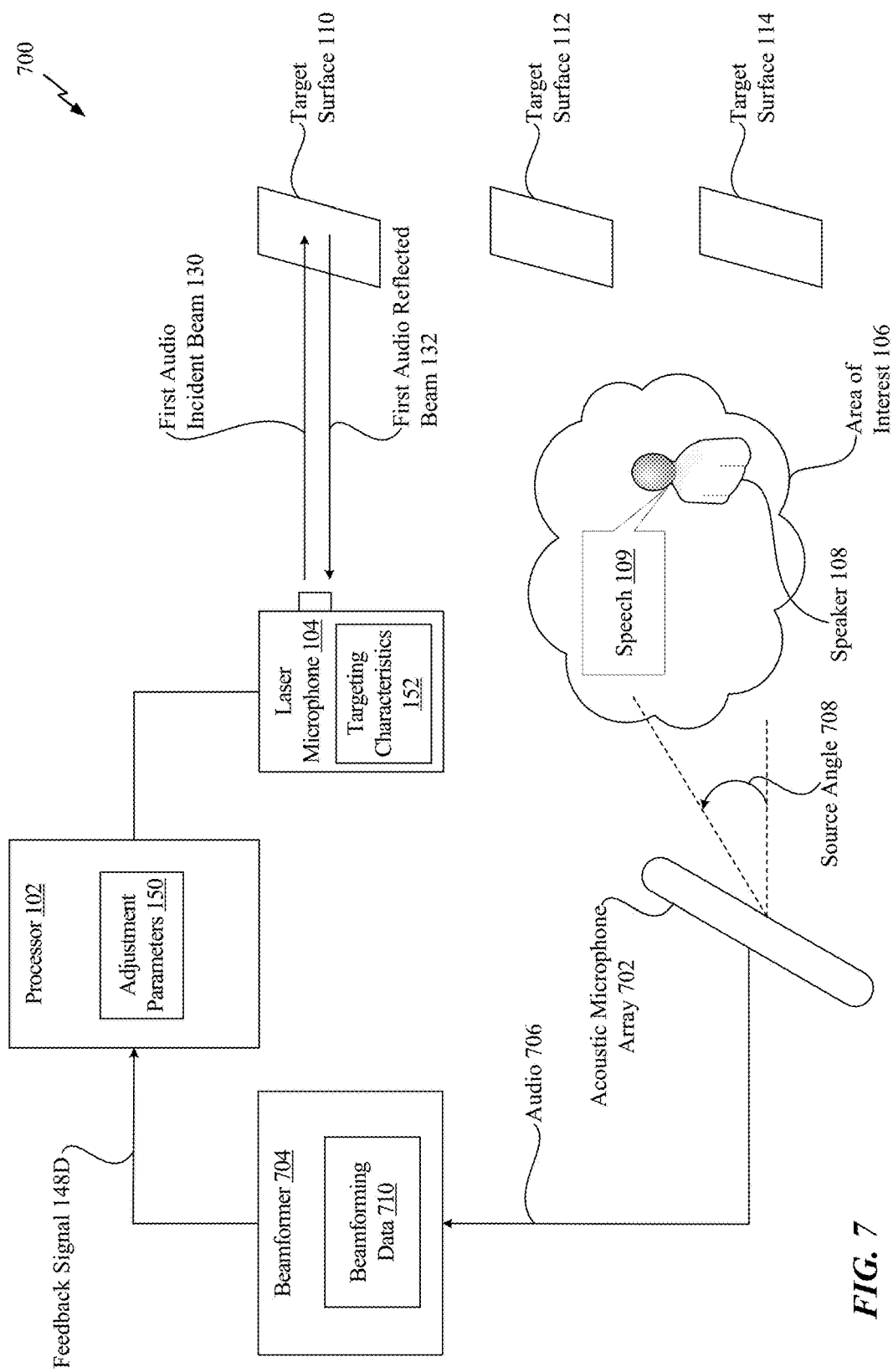
FIG. 7 is a diagram of a system that is operable to adjust a laser microphone to improve audio capture using beamforming data feedback.

Referring to FIG. 7, another system 700 that is operable to adjust a laser microphone to improve audio capture is shown. The system 700 includes the processor 102, the laser microphone 104, an acoustic microphone array 702, and a beamformer 704.

The acoustic microphone array 702 is configured to capture audio 706 proximate to the area of interest 106. For example, the acoustic microphone array 702 may capture the speech 109 and other audio. The captured audio 706 is provided to the beamformer 704. The beamformer 704 is configured to generate beamforming data 710 that indicates a source angle 708 associated with the captured audio 706. The source angle 708 is indicative of a location of activity in the area of interest 106 (e.g., a location of the speaker or a location where the speech 109 is generated). The beamformer 704 may generate a feedback signal 148D and provide the feedback signal 148D to the processor 102. The feedback signal 148D corresponds to the feedback signal 148 of FIGS. 1A-1B. In some implementations, the feedback signal 148D includes the beamforming data 710.

In response to receiving the feedback signal 148D (e.g., the beamforming data 710), the processor 102 determines how to adjust the targeting characteristics 152 of the laser microphone 104. For example, the processor 102 selects a target surface 110, 112, 114 associated with the source angle 708. Based on the selection, the processor 102 sets the adjustment parameters 150 and adjusts the targeting characteristics 152 of the laser microphone 104 so that the laser microphone 104 directs beams at a different target surface, such as the target surface 112 as shown in FIG. 1B.

The system 700 of FIG. 7 enables the processor 102 to adjust the targeting characteristics 152 of the laser microphone 104 based on the beamforming data 710. As a result, the system 700 facilitates dynamic readjustment of the targeting of the laser microphone 104 until high quality audio (e.g., high quality speech) is captured. In a similar manner, the system 700 can adjust the targeting characteristics 152 based on ultrasound data included in the feedback signal 148D.

Figure 8:
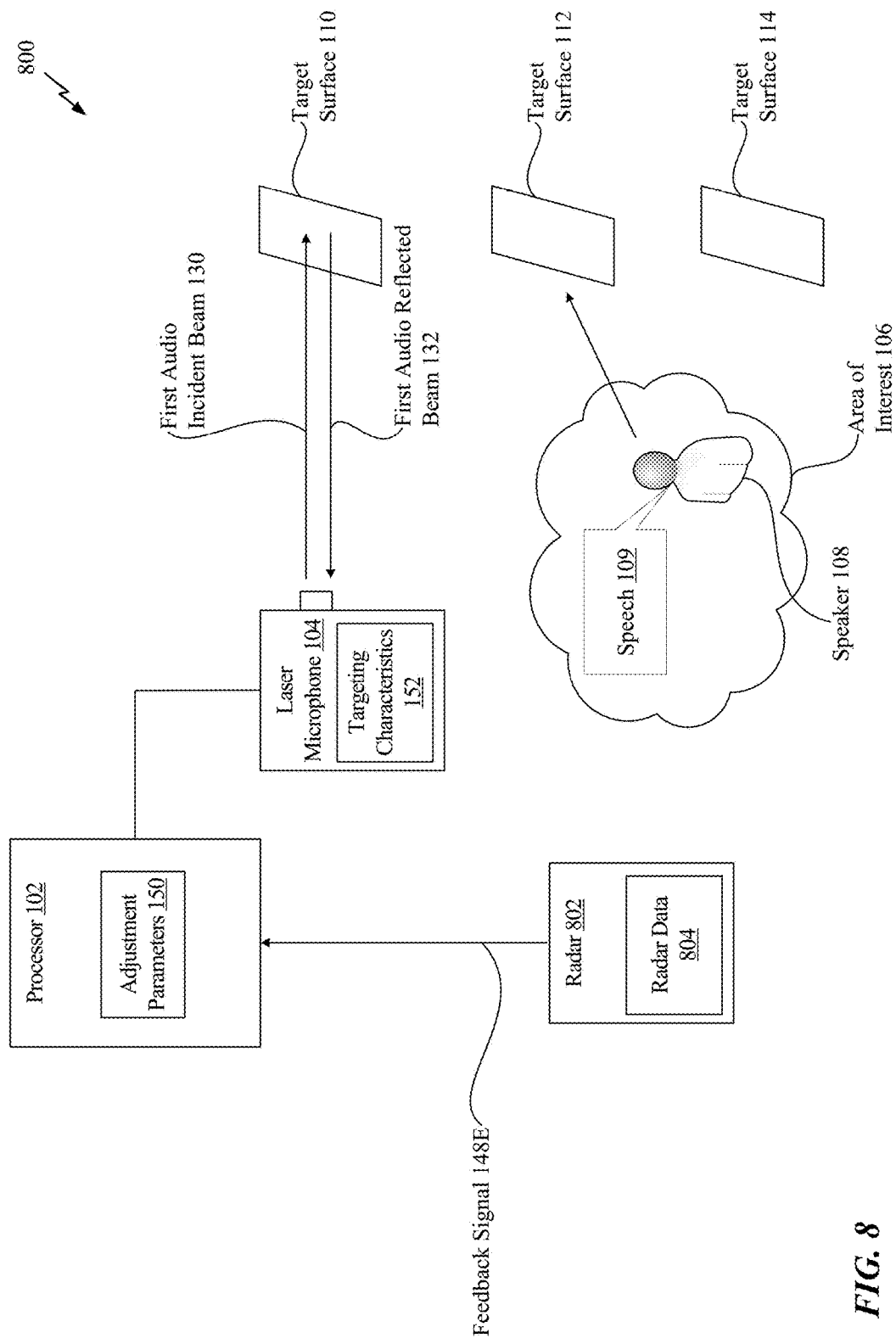
FIG. 8 is a diagram of a system that is operable to adjust a laser microphone to improve audio capture using radar data feedback.

Referring to FIG. 8, another system 800 that is operable to adjust a laser microphone to improve audio capture is shown. The system 800 includes the processor 102, the laser microphone 104, and a radar 802.

The radar 802 is configured to transmit radar signals towards the area of interest 106. The radar 802 is also configured to detect reflected radar signals from the area of interest 106. The reflected radar signals are scattered from objects proximate to the area of interest 106. The radar 802 is configured to generate radar data 804 based on the reflected radar signals. The radar data 804 indicates a position of an object (e.g., the speaker 108) in the area of interest 106, a direction of movement of the object in the area of interest 106, or both. For example, in FIG. 8, the speaker 108 may move towards the target surface 112, and the radar data 804 indicates the direction of the movement. Based on the movement, the laser microphone 104 may target nearby surfaces (e.g., the target surface 112). The radar 802 may generate a feedback signal 148E and provide the feedback signal 148E to the processor 102. The feedback signal 148E corresponds to the feedback signal 148 of FIGS. 1A-1B. In some implementations, the feedback signal 148E includes the radar data 804.

In response to receiving the feedback signal 148E (e.g., the radar data 804), the processor 102 determines how to adjust the targeting characteristics 152 of the laser microphone 104. For example, the processor 102 selects a target surface 110, 112, 114 proximate to the object indicated in the radar data 804. Based on the selection, the processor 102 sets the adjustment parameters 150 and adjusts the targeting characteristics 152 of the laser microphone 104 so that the laser microphone 104 directs beams at a different target surface, such as the target surface 112 as shown in FIG. 1B.

The system 800 of FIG. 8 enables the processor 102 to adjust the targeting characteristics 152 of the laser microphone 104 based on the position of the speaker 109 as detected by the radar 802. Thus, the system 800 facilitates dynamic readjustment of the targeting of the laser microphone 104 until high quality audio (e.g., high quality speech) is captured.

Although FIG. 8 illustrates a radar, in other implementations, an ultrasonic emitter and detector is used (in a similar manner as the radar 802) to generate ultrasonic data. For example, the ultrasonic emitter and detector may be configured to transmit ultrasonic signals towards the area of interest 106. The ultrasonic emitter and detector may also be configured to detect reflected ultrasonic signals from the area of interest 106. The ultrasonic emitter and detector is also configured to generate ultrasonic data based on the reflected ultrasonic signals. The ultrasonic data indicates a position of an object (e.g., the speaker 108) in the area of interest 106, a direction of movement of the object in the area of interest 106, or both. The feedback signal 148 may include the ultrasonic data.

Figure 9:
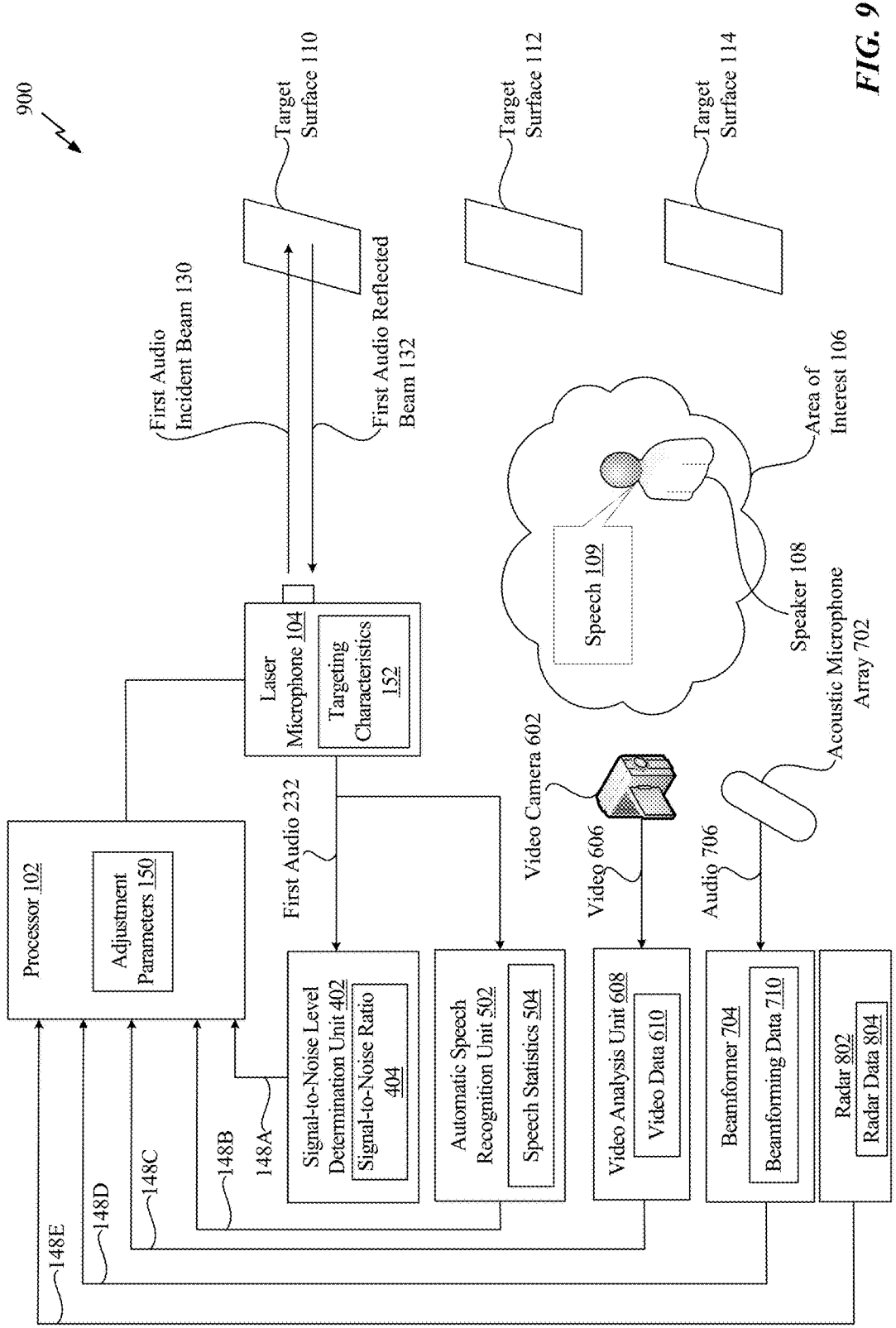
FIG. 9 is a diagram of a system that is operable to adjust a laser microphone to improve audio capture using multiple parameters as feedback.

Referring to FIG. 9, another system 900 that is operable to adjust a laser microphone to improve audio capture is shown. The system 900 includes the processor 102, the laser microphone 104, the signal-to-noise level determination unit 402, the automatic speech recognition unit 502, the video camera 602, the video analysis unit 608, the acoustic microphone array 702, the beamformer 704, and the radar 802. The feedback signals 148A-148E are provided to the processor 102. In a similar manner as described with respect to FIGS. 4-8, based on one or more of the feedback signals 148A-148E, the processor 102 adjusts the targeting characteristics 152 of the laser microphone 104 so that the laser microphone 104 directs beams at a different target surface, such as the target surface 112 as shown in FIG. 1B. Although the signal-to-noise level determination unit 402, the automatic speech recognition unit 502, the video camera 602, the acoustic microphone array 702, and the radar 802 are shown, in some implementations, one or more of the signal-to-noise level determination unit 402, the automatic speech recognition unit 502, the video camera 602, the acoustic microphone array 702, or the radar 802 is omitted.

Figure 10A:
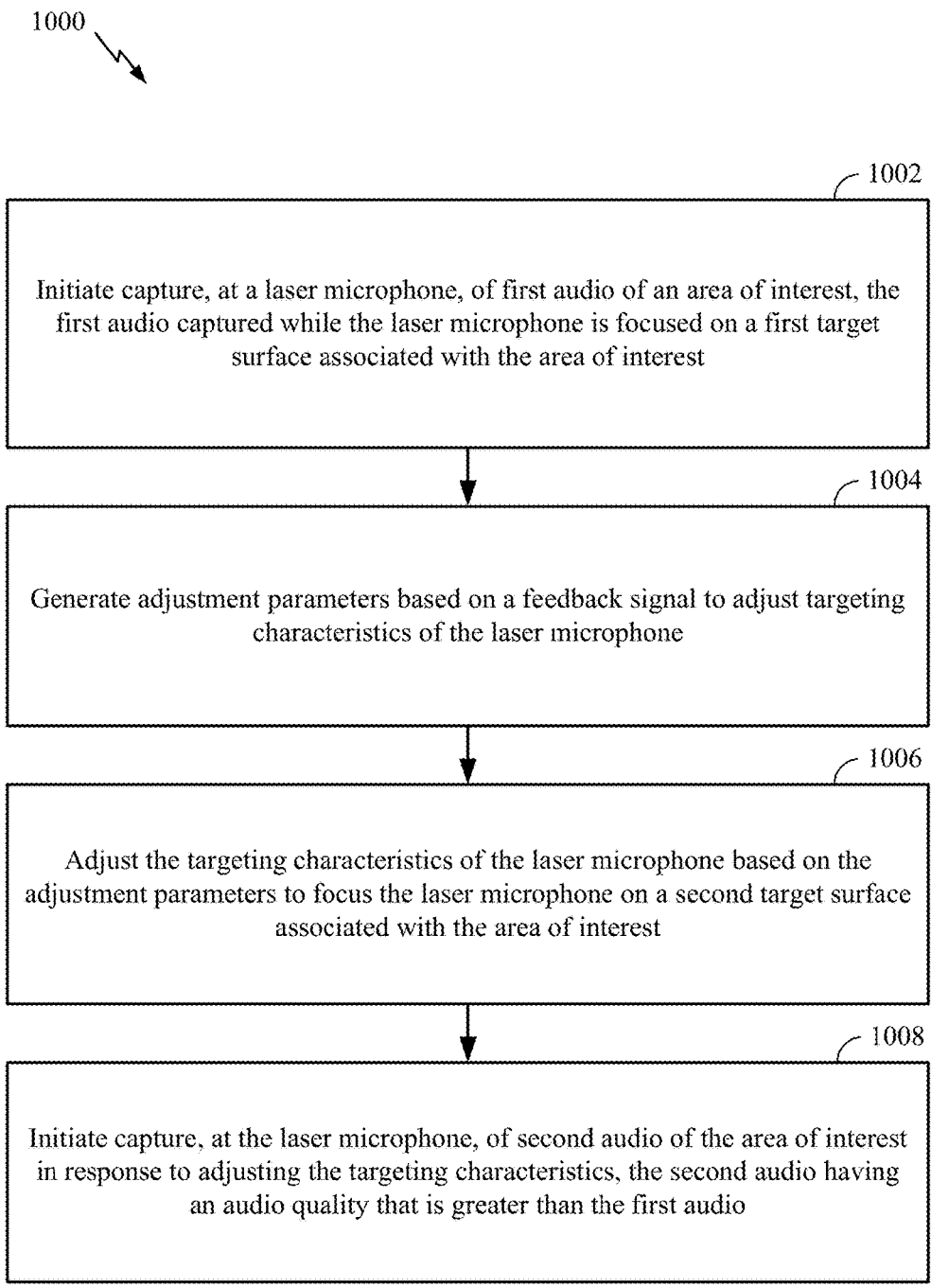
FIG. 10A illustrates a flowchart of a method for capturing audio.

Referring to FIG. 10A, a method 1000 for capturing audio is shown. The method 1000 may be performed by the system 100, the system 400, the system 500, the system 600, the system 700, the system 800, or the system 900, as illustrative examples.

The method 1000 includes initiating capture, at a laser microphone, of first audio of an area of interest, at 1002. The first audio is captured while the laser microphone is focused on a first target surface associated with the area of interest. For example, referring to FIG. 1A, the processor 102 initiates capture, at the laser microphone 104, of the first audio 232 of the area of interest 106. The first audio 232 is captured while the laser microphone 104 is focused on the target surface 110.

The method 1000 also includes generating adjustment parameters based on a feedback signal to adjust targeting characteristics of the laser microphone, at 1004. For example, referring to FIG. 1A, the processor 102 generates the adjustment parameters 150 based on the feedback signal 148 to adjust the targeting characteristics 152 of the laser microphone 104.

The method 1000 also includes adjusting the targeting characteristics of the laser microphone based on the adjustment parameters to focus the laser microphone on a second target surface associated with the area of interest, at 1006. For example, referring to FIG. 1A, the processor 102 adjusts the targeting characteristics 152 of the laser microphone 104 based on the adjustment parameters 150 to focus the laser microphone 104 on the target surface 112. As used herein, "focusing" the laser microphone 104 on a particular target surface may include pointing the laser microphone 104 at the particular target surface, directing an incident beam from the laser microphone 104 to the particular target surface, etc.

The method 1000 also includes initiating capture, at the laser microphone, of second audio of the area of interest in response to adjusting the targeting characteristics, at 1008. The second audio has an audio quality that is greater than the first audio. For example, referring to FIG. 1B, the processor 102 initiates capture, at the laser microphone 104, of the second audio 332 of the area of interest 106 in response to adjusting the targeting characteristics 152. The second audio 332 has an audio quality that is greater than the first audio 232 (e.g., a higher signal-to-noise ratio than the first audio 232, a higher amount of perceptible speech than the first audio 232, etc.).

The method 1000 enables the laser microphone 104 to capture high quality audio by adjusting the targeting characteristics 152 of the laser microphone 104 based on the feedback signal 148. For example, the second audio 332 captured while the laser microphone 104 is directed at the target surface 112 may have better audio quality (e.g., signal-to-noise ratio, volume, etc.) than the first audio 232 captured while the laser microphone 104 is directed at the target surface 110. The feedback signal 148 includes information that, when processed by the processor 102, enables the processor 102 to adjust the targeting characteristics 152 to focus the laser microphone 104 on a surface that enables capture of higher-quality audio. Thus, the method 1000 facilitates dynamic readjustment of the targeting of the laser microphone 104 until high quality audio (e.g., high quality speech) is captured.

Figure 10B:
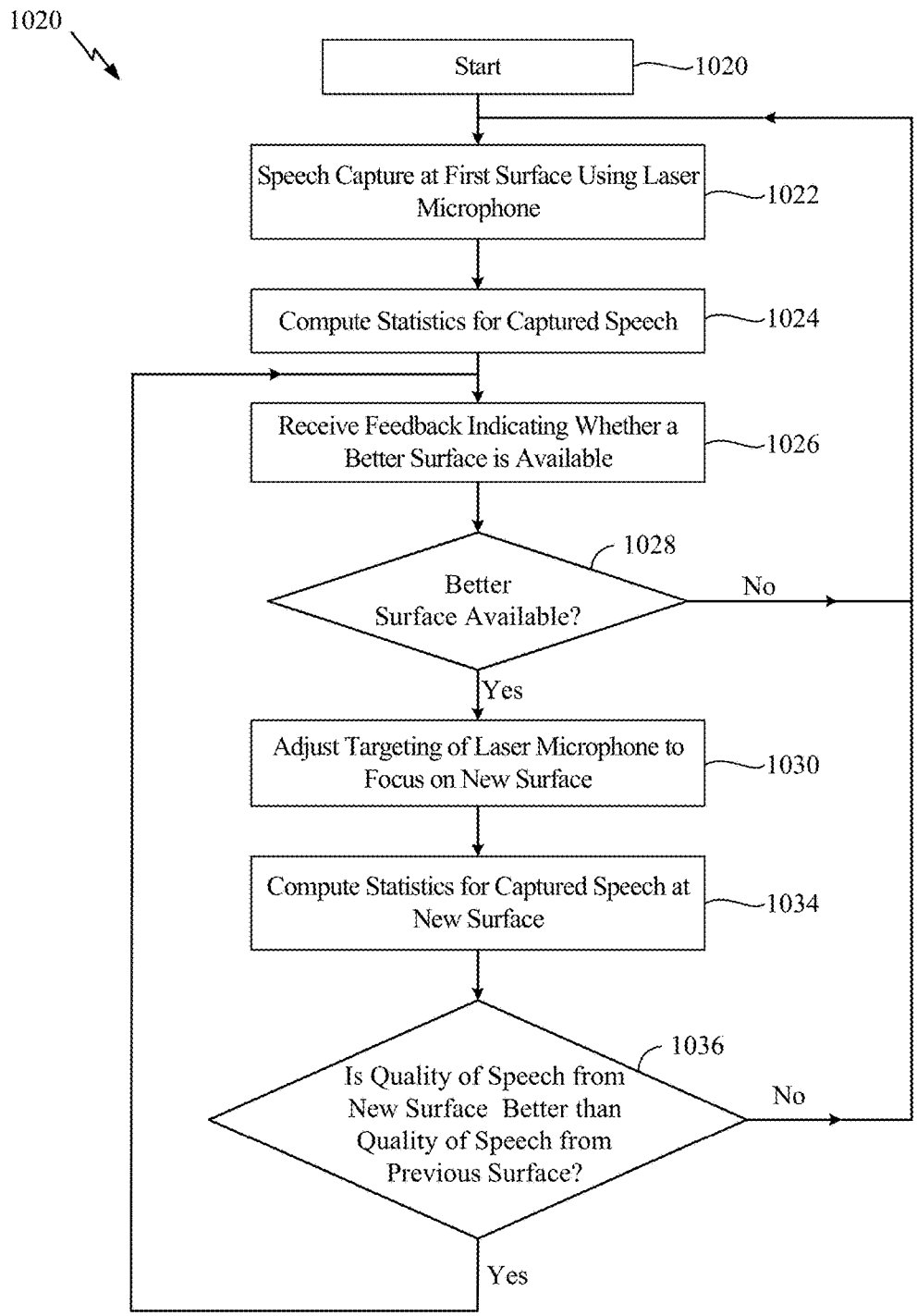
FIG. 10B illustrates a flowchart of another method for capturing audio.

Referring to FIG. 10B, another method 1020 for capturing audio is shown. The method 1020 may be performed by the system 100, the system 400, the system 500, the system 600, the system 700, the system 800, or the system 900, as illustrative examples.

At 1020, the method 1020 starts. Speech is captured at a first surface using a laser microphone, at 1022. For example, the laser microphone 104 directs the first audio incident beam 130 at the target surface 110 to detect the speech 109 (e.g., the first audio 232) based on vibrations associated with the target surface 110. Statistics for the captured speech are computed, at 1022. For example, the signal-to-noise level determination unit 402 determines the signal-to-noise ratio 404 of the first audio 232, the automatic speech recognition unit 502 determines the speech statistics 504 of the first audio 232, or both.

At 1026, feedback indicating whether a better surface is available is received. For example, the processor 102 receives the feedback signal 148. As described above, the feedback signal 148 may correspond to the feedback signal 148A, the feedback signal 148B, the feedback signal 148C, the feedback signal 148D, the feedback signal 148E, or a combination thereof. At 1028, the method 1020 includes determining whether a better surface is available. If a better surface is not available, the method 1020 returns to 1022.

However, if a better surface is available, the method 1020 includes adjusting the targeting of the laser microphone to focus on the new surface, at 1030. For example, the targeting characteristics 152 of the laser microphone 104 are adjusted to focus the laser microphone 104 on the target surface 112. Statistics for the captured speech at the new surface is computed, at 1034. For example, the signal-to-noise level determination unit 402 determines the signal-to-noise ratio 404 of the second audio 332, the automatic speech recognition unit 502 determines the speech statistics 504 of the second audio 332, or both. At 1036, the method 1020 includes determining whether the quality of speech from the new surface is better than the quality of speech from the previous surface. If the quality of speech from the new surface is better than the quality of speech from the previous surface, the method 1020 returns to 1026. However, if the quality of speech from the new surface is not better than the quality of speech from the previous surface, the method 1020 returns to 1022.

Figure 11:
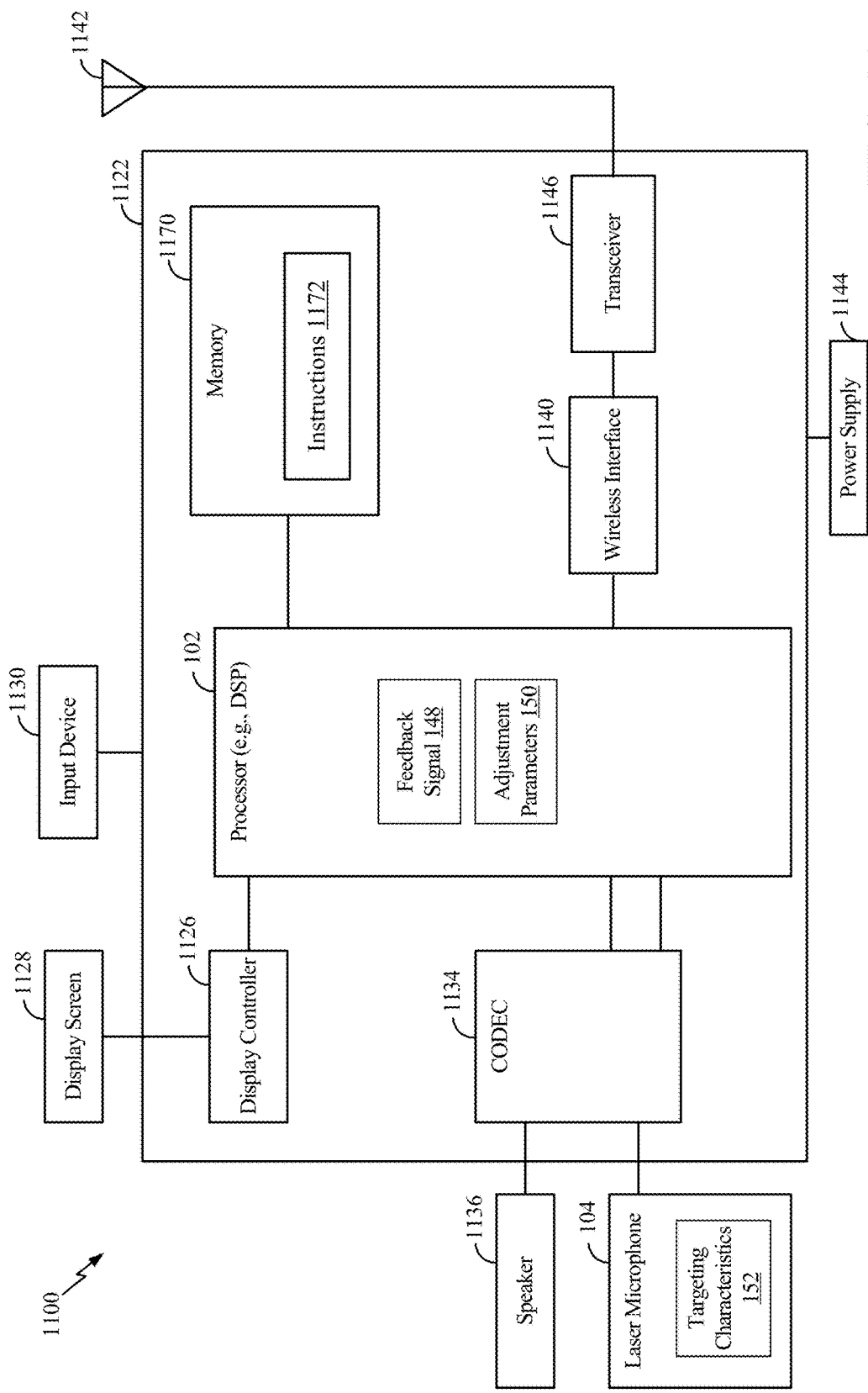
FIG. 11 is a block diagram of a particular illustrative example of a mobile device that is operable to perform the techniques described with reference to FIGS. 1A-10B.

Referring to FIG. 11, a block diagram of a particular illustrative implementation of a mobile device 1100 (e.g., a wireless communication device) is shown. In various implementations, the mobile device 1100 may have more components or fewer components than illustrated in FIG. 11. In a particular implementation, the mobile device 1100 includes the processor 102, such as a central processing unit (CPU) or a digital signal processor (DSP), coupled to a memory 1170. The memory 1170 includes instructions 1172 (e.g., executable instructions) such as computer-readable instructions or processor-readable instructions. The instructions 1172 may include one or more instructions that are executable by a computer, such as the processor 102.

FIG. 11 also illustrates a display controller 1126 that is coupled to the processor 102 and to a display screen 1128. A coder/decoder (CODEC) 1134 may also be coupled to the processor 102. A speaker 1136 and the laser microphone 104 are coupled to the CODEC 634. FIG. 11 further illustrates that a wireless interface 1140, such as a wireless controller, and a transceiver 1146 may be coupled to the processor 102 and to an antenna 1142, such that wireless data received via the antenna 1142, the transceiver 1146, and the wireless interface 1140 may be provided to the processor 102.

In some implementations, the processor 102, the display controller 1126, the memory 1170, the CODEC 1134, the wireless interface 1140, and the transceiver 1146 are included in a system-in-package or system-on-chip device 1122. In some implementations, an input device 1130 and a power supply 1144 are coupled to the system-on-chip device 1122. Moreover, in a particular implementation, as illustrated in FIG. 11, the display screen 1128, the input device 1130, the speaker 1136, the laser microphone 104, the antenna 1142, and the power supply 1144 are external to the system-on-chip device 1122. In a particular implementation, each of the display screen 1128, the input device 1130, the speaker 1136, the laser microphone 104, the antenna 1142, and the power supply 1144 may be coupled to a component of the system-on-chip device 1122, such as an interface or a controller.

The mobile device 1100 may include a headset, a smart watch, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

In an illustrative implementation, the memory 1170 may include or correspond to a non-transitory computer readable medium storing the instructions 1172. The instructions 1172 may include one or more instructions that are executable by a computer, such as the processor 102. The instructions 1172 may cause the processor 102 to perform the method 1000 of FIG. 10A, the method 1020 of FIG. 10B, or both.

One or more components of the mobile device 1100 may be implemented via dedicated hardware (e.g., circuitry), by a processor executing instructions to perform one or more tasks, or a combination thereof. As an example, the memory 1170 or one or more components of the processor 102, and/or the CODEC 1134 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 1172) that, when executed by a computer (e.g., a processor in the CODEC 1134 or the processor 102), may cause the computer to perform one or more operations described with reference to FIGS. 1A-10B.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

In conjunction with the described techniques, an apparatus includes means for capturing first audio of an area of interest. The first audio is captured while the means for capturing is focused on a first target surface associated with the area of interest. For example, the means for capturing may include the laser microphone 104, one or more other devices, circuits, modules, sensors, or any combination thereof.

The apparatus also includes means for generating adjusting parameters based on a feedback signal to adjust targeting characteristics of the means for capturing. For example, the means for generating may include the processor 102, one or more other devices, circuits, modules, or any combination thereof.

The apparatus also includes means for adjusting the targeting characteristics of the means for capturing based on the adjustment parameters to focus the means for capturing on a second target surface associated with the area of interest. For example, the means for adjusting may include the processor 102, one or more other devices, circuits, modules, or any combination thereof. Second audio of the area of interest is captured by the means for capturing in response to adjusting the targeting characteristics. The second audio has an audio quality that is greater than the first audio.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
   a laser microphone;
   a processor coupled to the laser microphone, the processor configured to:
      initiate capture, at the laser microphone, of first audio of an area of interest, the first audio captured while the laser microphone is focused on a first target surface associated with the area of interest;
      generate adjustment parameters based on a feedback signal to adjust targeting characteristics of the laser microphone;
      adjust the targeting characteristics of the laser microphone based on the adjustment parameters to focus the laser microphone on a second target surface associated with the area of interest; and
      initiate capture, at the laser microphone, of second audio of the area of interest in response to adjusting the targeting characteristics, the second audio having an audio quality that is greater than the first audio; and
   a radar configured to:
      transmit radar signals towards the area of interest;
      detect reflected radar signals from the area of interest; and
      generate radar data based on the reflected radar signals, the radar data indicating a position of an object in the area of interest, a direction of movement of the object in the area of interest, or both, wherein the feedback signal includes the radar data.

2. The apparatus of claim 1, wherein the targeting characteristics include at least one of an angle of rotation of the laser microphone, a tilt of the laser microphone, a transmit power of the laser microphone, or a focus metric of the laser microphone.

3. The apparatus of claim 1, further comprising a signal-to-noise level determination unit configured to determine a signal-to-noise ratio of the first audio, wherein the feedback signal indicates the signal-to-noise ratio.

4. The apparatus of claim 1, further comprising an automatic speech recognition unit configured to perform an automatic speech recognition operation on the first audio to generate speech statistics associated with the first audio, wherein the feedback signal indicates the speech statistics.

5. The apparatus of claim 1, further comprising:
   a video camera configured to capture video of the area of interest; and
   a video analysis unit configured to generate video data based on the captured video, wherein the feedback signal further includes the video data.

6. The apparatus of claim 1, further comprising:
   a microphone array configured to capture audio proximate to the area of interest; and
   a beamformer configured to generate beamforming data indicating a source angle associated with the captured audio, the source angle indicative of a location of activity in the area of interest, wherein the feedback signal further includes the beamforming data.

7. The apparatus of claim 1, further comprising:
an ultrasonic emitter and detector configured to:
  transmit ultrasonic signals towards the area of interest;
  detect reflected ultrasonic signals from the area of interest; and
  generate ultrasonic data based on the reflected ultrasonic signals, the ultrasonic data indicating the position of the object in the area of interest, the direction of movement of the object in the area of interest, or both, wherein the feedback signal further includes the ultrasonic data.

8. The apparatus of claim 1, wherein the laser microphone includes a Laser Doppler Vibrometer.

9. The apparatus of claim 1, wherein the laser microphone is configured to:
generate a beam of light at the laser microphone;
split the beam of light into a reference beam and into an incident beam that is directed towards the first target surface, the reference beam and the incident beam having similar properties;
receive a reflected beam from the first target surface, the reflected beam corresponding a reflected version of the incident beam, and the reflected beam and the incident beam having different properties;
perform a superposition operation on the reflected beam and the reference beam to generate a demodulated output signal; and
generate the first audio based on the demodulated output signal.

10. A method of capturing audio, the method comprising:
initiating capture, at a laser microphone, of first audio of an area of interest, the first audio captured while the laser microphone is focused on a first target surface associated with the area of interest;
receiving ultrasonic data indicating a position of an object in the area of interest, a direction of movement of the object in the area of interest, or both, the ultrasonic data generated from reflected ultrasonic signals detected by an ultrasonic detector;
generating adjustment parameters based on a feedback signal to adjust targeting characteristics of the laser microphone, wherein the feedback signal includes the ultrasonic data;
adjusting the targeting characteristics of the laser microphone based on the adjustment parameters to focus the laser microphone on a second target surface associated with the area of interest; and
initiating capture, at the laser microphone, of second audio of the area of interest in response to adjusting the targeting characteristics, the second audio having an audio quality that is greater than the first audio.

11. The method of claim 10, wherein the targeting characteristics include at least one of an angle of rotation of the laser microphone, a tilt of the laser microphone, a transmit power of the laser microphone, or a focus metric of the laser microphone.

12. The method of claim 10, further comprising determining a signal-to-noise ratio of the first audio, wherein the feedback signal indicates the signal-to-noise ratio.

13. The method of claim 10, further comprising performing an automatic speech recognition operation on the first audio to generate speech statistics associated with the first audio, wherein the feedback signal indicates the speech statistics.

14. The method of claim 10, further comprising receiving video data indicating a location of activity in the area of interest, a location of a target surface associated with area of interest, a direction of movement of a speaker in the area of interest, or a location of an obstruction in the area of interest, the video data based on video of the area of interest captured by a video camera, wherein the feedback signal further includes the video data.

15. The method of claim 10, further comprising receiving beamforming data indicating a source angle of audio captured from a microphone array, the source angle indicative of a location of activity in the area of interest, wherein the feedback signal further includes the beamforming data.

16. The method of claim 10, further comprising receiving radar data indicating the position of the object in the area of interest, the direction of movement of the object in the area of interest, or both, the radar data generated from reflected radar signals detected by a radar, wherein the feedback signal further includes the radar data.

17. The method of claim 10, wherein the laser microphone includes a Laser Doppler Vibrometer.

18. The method of claim 10, wherein capturing the first audio comprises:
generating a beam of light at the laser microphone;
splitting the beam of light into a reference beam and into an incident beam that is directed towards the first target surface, the reference beam and the incident beam having similar properties;
receiving a reflected beam from the first target surface, the reflected beam corresponding a reflected version of the incident beam, and the reflected beam and the incident beam having different properties;
performing a superposition operation on the reflected beam and the reference beam to generate a demodulated output signal; and
generating the first audio based on the demodulated output signal.

19. A non-transitory computer-readable medium comprising instructions that, when executed by a processor, cause the processor to perform operations comprising:
initiating capture, at a laser microphone, of first audio of an area of interest, the first audio captured while the laser microphone is focused on a first target surface associated with the area of interest;
receiving radar data indicating a position of an object in the area of interest, a direction of movement of the object in the area or interest, or both, the radar data generated from reflected radar signals detected by a radar;
generating adjustment parameters based on a feedback signal to adjust targeting characteristics of the laser microphone, wherein the feedback signal includes the radar data;
adjusting targeting characteristics of the laser microphone based on the adjustment parameters to focus the laser microphone on a second target surface associated with the area of interest; and
initiating capture, at the laser microphone, of second audio of the area of interest in response to adjusting the targeting characteristics, the second audio having an audio quality that is greater than the first audio.

20. The non-transitory computer-readable medium of claim 19, wherein the targeting characteristics include at least one of an angle of rotation of the laser microphone, a tilt of the laser microphone, a transmit power of the laser microphone, or a focus metric of the laser microphone.

21. The non-transitory computer-readable medium of claim 19, wherein the operations further comprise determining a signal-to-noise ratio of the first audio, wherein the feedback signal indicates the signal-to-noise ratio.

22. The non-transitory computer-readable medium of claim 19, wherein the operations further comprise performing an automatic speech recognition operation on the first audio to generate speech statistics associated with the first audio, wherein the feedback signal indicates the speech statistics.

23. The non-transitory computer-readable medium of claim 19, wherein the operations further comprise receiving video data indicating a location of activity in the area of interest, a location of a target surface associated with area of interest, a direction of movement of a speaker in the area of interest, or a location of an obstruction in the area of interest, the video data based on video of the area of interest captured by a video camera, wherein the feedback signal further includes the video data.

24. The non-transitory computer-readable medium of claim 19, wherein the operations further comprise receiving beamforming data indicating a source angle of audio captured from a microphone array, the source angle indicative of a location of activity in the area of interest, wherein the feedback signal further includes the beamforming data.

25. An apparatus comprising:
  means for capturing first audio of an area of interest, the first audio captured while the means for capturing is focused on a first target surface associated with the area of interest;
  means for receiving ultrasonic data indicating a position of an object in the area of interest, a direction of movement of the object in the area of interest, or both, the ultrasonic data generated from reflected ultrasonic signals detected by an ultrasonic detector;
  means for generating adjustment parameters based on a feedback signal to adjust targeting characteristics of the means for capturing, wherein the feedback signal includes the ultrasonic data; and
  means for adjusting the targeting characteristics of the means for capturing based on the adjustment parameters to focus the means for capturing on a second target surface associated with the area of interest,
  wherein second audio of the area of interest is captured by the means for capturing in response to adjusting the targeting characteristics, the second audio having an audio quality that is greater than the first audio.

26. The apparatus of claim 25, wherein the targeting characteristics include at least one of an angle of rotation of the means for capturing, a transmit power of the means for capturing, a tilt of the means for capturing, or a focus metric of the means for capturing.

27. The apparatus of claim 25, further comprising means for determining a signal-to-noise ratio of the first audio, wherein the feedback signal indicates the signal-to-noise ratio.

\* \* \* \* \*